Figure 1:
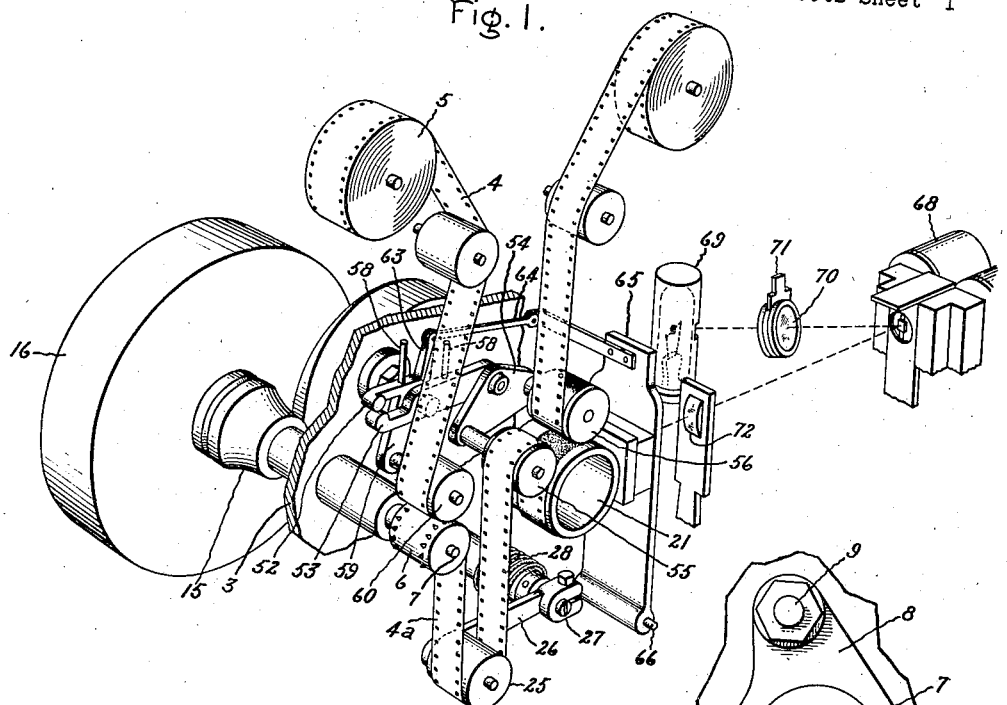

June 2, 1931.

C. L. HEISLER 1,808,551

FILM DRIVING

Filed Aug. 11, 1927    2 Sheets-Sheet 1

Inventor:
Charles L. Heisler,
by
His Attorney.

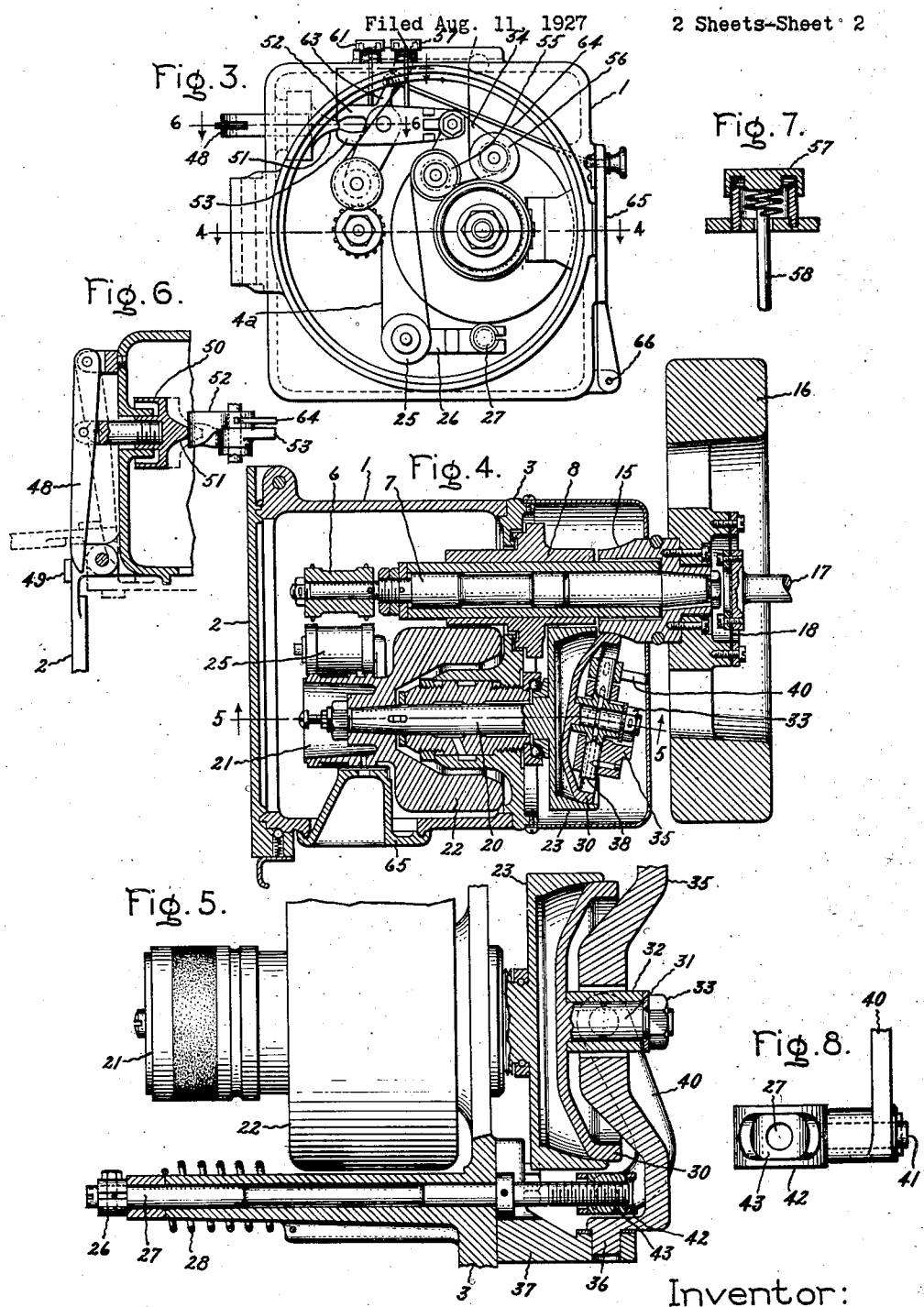

Patented June 2, 1931

1,808,551

UNITED STATES PATENT OFFICE

CHARLES L. HEISLER, OF SCHENECTADY, NEW YORK, ASSIGNOR TO GENERAL ELECTRIC COMPANY, A CORPORATION OF NEW YORK

FILM DRIVING

Application filed August 11, 1927. Serial No. 212,349.

My invention relates to the recording of sound on a film and the reproduction of the sound from a film record. A convenient manner of making a sound film record is to expose a moving light-sensitive film, such for example as a motion picture film, to a light beam which is caused to vary in intensity or position in accordance with the sound waves to be recorded. For moving the film it is usual to provide the film with a row of sprocket tooth openings along each edge which openings are engaged by the teeth on suitable sprocket wheels over which the film is led in passing from one reel to the other as in motion picture apparatus. For moving the film where it is exposed to the variable light beam in the recording process and for moving the film bearing the sound record when it is passed through a constant light beam in the reproducing process I have found it desirable to employ a belt-type drive rather than a sprocket drive, and for this purpose I use a smooth faced wheel or drum rather than a sprocket wheel and rotate it at a substantially uniform speed. When both drum and sprocket wheels are connected to be driven from a common driving member, I have found it to be very difficult to construct the wheel or drum having a diameter of such exactness that the film will be moved by the wheel or drum at exactly the same linear speed as it is moved by the sprocket wheels. Even if such exactness were practicable the loop of film formed between the drum and a sprocket wheel would invariably gradually increase or gradually decrease as the film is passed from one reel to the other, because of well known imperfections in sprocket transmitting actions. If conditions are such that the loop continues to decrease until it disappears and the film is drawn tight, a certain amount of slipping of the film over the drum is bound to occur. On the contrary, if the loop continues to increase, it is liable to become tangled up in the apparatus and be broken. The evil results of such increase and decrease in the size of the loop are still worse in the case of a combined motion picture and sound record film where proper synchronism between the pictures and the reproduced sounds depends upon the uniformity of the distance measured along the film between the sound reproducer and the picture projector.

Shrinkage of the film due to developing and age also seriously affect the relative rates at which it is passed by the sprockets and the drum. It will readily be seen that a shrunken film will be moved by the sprockets at a slower linear speed than one which has not shrunk, hence there is a tendency for the loop between the drum and a sprocket at one side of the drum to steadily decrease until it is drawn tight and is forced to slip over the drum and for the loop between the drum and a sprocket on the other side of the drum to steadily increase.

One object of my invention is to provide an improved method of, and means for, moving a sound record film by means of both sprocket and belt-type drives whereby the above mentioned difficulties are avoided. Another object of my invention is to provide an improved means for separating the film engaging means, whereby threading of the film through the apparatus is facilitated.

In accordance with my present invention I operate the film driving sprocket or sprockets at a substantially constant speed and operate the belt-type drive for the film at approximately the same speed, but vary the speed of the belt-type drive when necessary in such a manner that the film is moved at the same rate by both drives. For the purpose of illustration I have chosen to show my invention as comprising a portion of a sound recording apparatus. It will be understood, however, that my invention is not limited to such, but is applicable also to the apparatus by which the sound recorded on a film is reproduced.

My invention will be better understood from the following description taken in connection with the accompanying drawings, and its scope will be pointed out in the appended claims.

Figure 2:
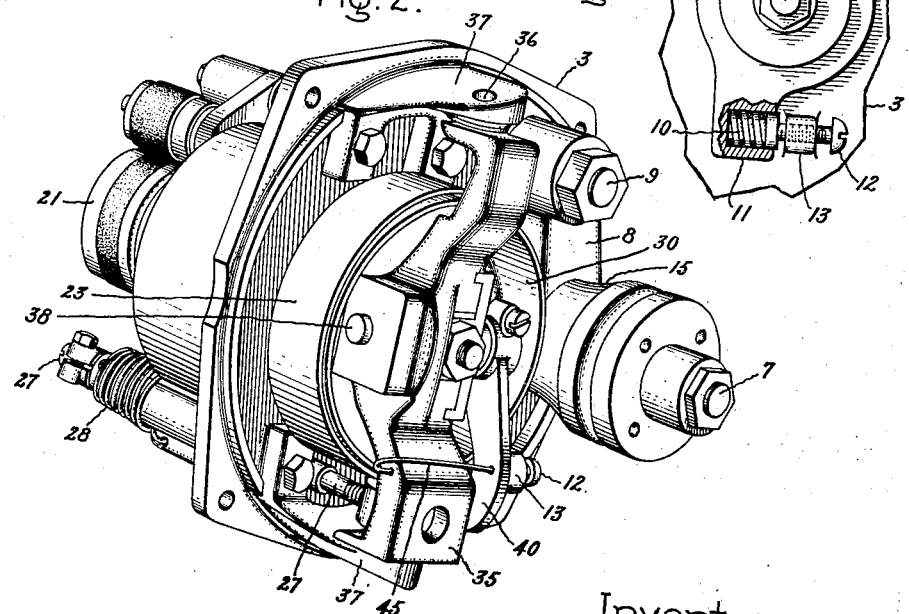
Figure 9:
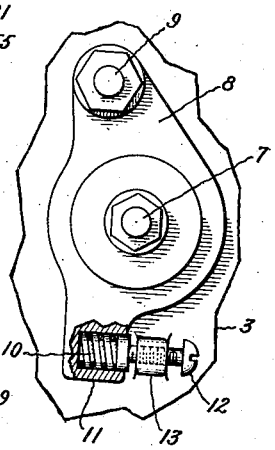

Referring to the drawings, Figs. 1 and 2 are perspective views of the apparatus with the enclosing casing removed as viewed from opposite sides thereof; Fig. 3 is an end view corresponding to Fig. 1; Fig. 4 is a transverse sectional view on the line 4—4 of Fig. 3; Fig. 5 is a fragmentary sectional view on line 5—5 of Fig. 4 drawn to a larger scale; Fig. 6 is a fragmentary sectional view on line 6—6 of Fig. 3; and Figs. 7, 8 and 9 illustrate details.

In the drawings the enclosing casing 1 has a door 2 at one end giving access to the film and film engaging wheels and an end head or frame 3 at the other end by which the moving parts are supported. The film 4 is drawn from the reel 5 by the sprocket wheel 6 fixed to shaft 7 which is journalled in an adjustable bearing member 8, this member and the frame 3 being provided with cooperating flanges to constitute a suitable light trap. Bearing member 8 is pivoted to frame 3 at 9 and by means of the spring 10 mounted in the lug 11 and the adjusting screw 12 threaded in the lug 13 the shaft 7 carried by this member is resiliently moved to the left as viewed in Figs. 2 and 9 for a purpose to be described herein after. Shaft 7 has secured to it the friction wheel 15 to which the fly wheel 16 is shown secured. Drive shaft 17 is shown connected to the fly wheel by a vibration absorbing coupling which for example may comprise a leather disk 18.

Journalled in the frame 3 is the shaft 20 upon one end of which is fixed the film engaging drum 21 which is shown as having an enlarged portion 22 forming a fly wheel. On the opposite end of shaft 20 is the friction wheel 23 which is driven from friction wheel 15 through a variable speed mechanism now to be described. As was pointed out above, if the film is driven both by the sprocket 6 and the drum 21 and not allowed to slip on the drum, the loop of film 4a between the sprocket and drum will either increase or decrease in size due to the fact that the two drives will not pass the film at exactly the same speed. I have provided the idler 25 to engage the loop of film and mount the idler on the arm 26 fixed to shaft 27 which is journalled in frame 3. A light spring 28 rotates the shaft 27 and arm 26 so as to take up the slack in the film loop and maintain a constant tension in the film as it is fed to the drum 21. Any slight variation in the position of the arm 26 due to changes in the size of the loop changes the speed of the drum 21 relative to the speed of the sprocket. Rotative movement is communicated to friction wheel 23 by which the drum is rotated from friction wheel 15 through friction wheel 30. This wheel is fixed on the stud 31 which is freely rotatable in the sleeve 32 being retained by the nut 33. Sleeve 32 has a gimbal joint mounting whereby the angular position of the wheel 30 may be varied thus changing its contact path on the periphery of the friction wheels 15 and 23, thereby varying the relative speed at which the drum is driven. This mounting comprises the rocking member 35 having trunnions 36 at opposite ends journalled in the brackets 37 secured to the frame 3. Bearing sleeve 32 is pivotally mounted in the rocking member 35 by means of the trunnions 38 thereon. Secured to one of the trunnions 38 is the arm 40 in whose opposite end is journalled the stud 41 of the retaining member 42 for the cylindrical nut 43. The nut is threaded on the end of shaft 27 and through the retaining member has universal movement relative to the arm 40. The contacting surfaces of friction wheels 15, 23 and 30 are curved such that a driving connection is provided therebetween and as the wheel 30 is tilted more or less from the position illustrated in Fig. 4 its engaging tracks on the other two wheels vary inversely in their diameter. An important feature of the construction is the arrangement whereby the wheel 30 is not forcibly slid over the surfaces of the cooperating wheels 15 and 23 but is caused to roll to its new position by virtue of the rocking movement on the axis of trunnions 38 given to the wheel by the arm 40. An extremely light controlling force only is thereby required to produce a desired change in speed of the drum, hence a very light spring 28 may be employed and only slight changes in tension of the film in the loop are produced. In Fig. 2 I have shown a small spring 45 between member 35 and arm 40 to take up any back lash.

For convenience in threading the film through the machine I have provided means automatically operable upon movement of the door 2 to a predetermined open position for separating the various wheels between which the film is clamped. This means, best shown in Figs. 1, 3 and 6 comprises a lever 48 fulcrumed to the enclosing casing and adapted to be engaged by the bar 49 extending up from the hinge portion of the door 2. The bar 49 is so positioned that the door may be opened to a right angle position without the bar moving the lever, thus giving access to the film and engaging mechanism without interfering with their operations. If it is desired to rethread the film, the door, which is omitted in Fig. 3, is swung open farther when the bar 49 moves the lever inward. Within the casing and connected to the lever by a rod is the spreader 50 having a wedge-shaped nose 51, opposite sides of which engage the levers 52 and 53 pivotally supported at a common point. Lever 53 pivotally supports at its opposite end the plate 54 which carries the pivot pins of the idlers 55 and 56. By the adjustable spring mounting 57, shown enlarged in Fig. 7, the rod 58 engaging lever 53 resiliently presses the idlers 55 and 56 against the drum with the film interposed. The other lever 52 has a depending arm 59 on which is pivoted the idler 60 and this lever is resiliently held by adjustable spring means 61 similar to that described for lever 53 in a position to cause the idler 60 to clamp the film against the sprocket 6. Lever 52 also has an arm 63 which by link 64 connects with the aperture holding member 65. The latter is pivotally supported at 66 and carries a narrow light aperture which is arranged close to the film on the drum and through which light is admitted to the film. By this construction it will be seen that when the door 48 is swung wide open, the spreader 50 by the rocking levers 52 and 53 moves idlers 55 and 56 away from the drum 21, moves idler 60 away from sprocket 6 and moves aperture holding member 65 away from the drum. A film may then be easily and quickly threaded. This part of my invention I have claimed in my copending application, Serial No. 312,391, filed October 13, 1928.

In Fig. 1, I have shown the apparatus arranged to record sound on the film, electric vibrations from a suitable pick-up device, not shown, actuating the mirror of the oscillograph 68 to oscillate a beam of light from the source 69 on the aperture in member 65. In the path of its beam I have shown the condensing lens 70 having the diaphragm 71 and the cylindrical lens 72. While I have illustrated my invention as applied to recording apparatus it is not limited thereto but is equally applicable to reproducing apparatus where for example a steady narrow beam of light is thrown on the film record and a photo-electric cell is placed behind the film as it passes over the drum.

The apparatus which I have disclosed may be used alone for recording sound on or for reproducing sound from a film or may be used in conjunction with a motion picture camera or motion picture projector, in which case the film may bear both sound and picture records and pass successively through the sound and picture apparatus on its journey from the unwinding reel to the winding reel.

In the latter case where sound and picture apparatus are combined it is found desirable for obtaining proper synchronism to employ a sprocket such as that shown at 6 and operatively connected to the picture apparatus to feed the film to the drum 21. Under certain conditions, such as where the sound apparatus is used alone, a belt-type drive may be substituted for the sprocket 6 which drive takes the varying load incident to withdrawing the film from the unwinding reel.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. The method of moving the film in a sound recording or in a sound reproducing apparatus having a common driving member and a sprocket drive and a belt-type drive connected therewith and arranged in successive engagement with the film which comprises operating the sprocket drive at the same angular speed as the driving member independent of the load and varying the connection of the driving member with the belt-type drive in accordance with the length of film between the two drives.

2. Apparatus for recording sound on or for reproducing sound from a film comprising a sprocket drive and a belt-type drive arranged simultaneously to engage the film, common operating means for said drives, means devoid of slippage for connecting the operating means with the sprocket drive, and means responsive to the length of film between said drives for varying the speed at which the belt-type drive is operated by said operating means.

3. Apparatus for recording sound on or for reproducing sound from a film comprising a plurality of drives for the film including a toothed wheel and a smooth faced wheel, a common operating means therefor having a connection with each of said drives, the connection with the toothed wheel being non-slippable, and means arranged in the connection with said smooth faced wheel for automatically regulating the speed thereof in accordance with the length of film between the drives to cause said drives to move the film at equal speeds.

4. Apparatus for recording sound on or for reproducing sound from a film comprising a shaft, a sprocket drive for the film having a positive non-slippable drive connection with the shaft, a drum over which the film passes, a variable speed connection between the shaft and drum, and means responsive to the length of film between the sprocket and the drum for controlling said connection.

5. Apparatus of the character described comprising a sprocket and a drum arranged to engage a film serially, a variable speed connection between the sprocket and the drum comprising a plurality of wheels having contact surfaces of variable diameter and an oscillatably mounted wheel engaging the contact surfaces of said wheels, and means controlled by the length of film between the sprocket and drum for oscillating the latter wheel.

6. Apparatus of the character described comprising a sprocket and a drum arranged to engage a film serially, a driving connection therebetween comprising a pair of wheels having contact surfaces of variable diameter connected respectively with said sprocket and said drum and a third wheel engaging the contact surfaces of said pair of wheels and having a gimbal mounting whereby oscillation of the axis of said third wheel causes said third wheel to change its line of contact with each of said pair of wheels.

7. Apparatus of the character described comprising two driving members arranged to engage a film serially, and a variable speed connection between said members comprising a plurality of friction wheels of varying diameter and an intermediate friction wheel cooperating therewith having an axis angularly adjustable to cause the wheel to change the line of contact made by it on the other friction wheels.

8. Apparatus of the character described comprising two driving members arranged to engage a film serially, and a variable speed connection between said members comprising friction wheels of varying diameter and having fixed mountings and a cooperating friction wheel having its axis angularly adjustable on an axis passing through its points of contact with said friction wheels whereby its rotation automatically causes it to vary its lines of contact with said wheels.

9. Apparatus of the character described comprising a sprocket and a drum arranged to engage a film serially, means for driving one of said members, a variable speed driving connection between said members, comprising a plurality of members having curved friction surfaces of varying diameter, an intermediate friction wheel arranged to contact therewith and means for supporting said wheel for movement on each of two axes at right angles to each other and to the axis of the wheel, and means responsive to a change in the length of film between said members for adjusting the friction wheel on one of said axes.

In witness whereof, I have hereunto set my hand this 10th day of August, 1927.

CHARLES L. HEISLER.